No. 839,281. PATENTED DEC. 25, 1906.
F. S. FLUKE & F. P. VAUGHAN.
NUT LOCK.
APPLICATION FILED MAR. 7, 1906.
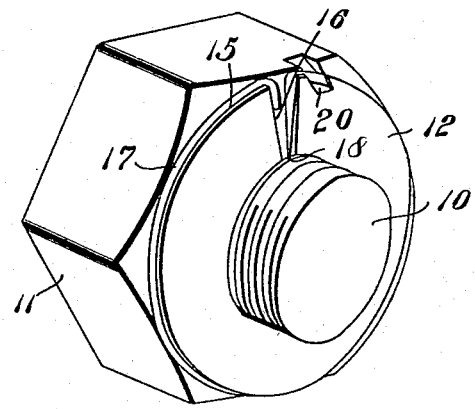
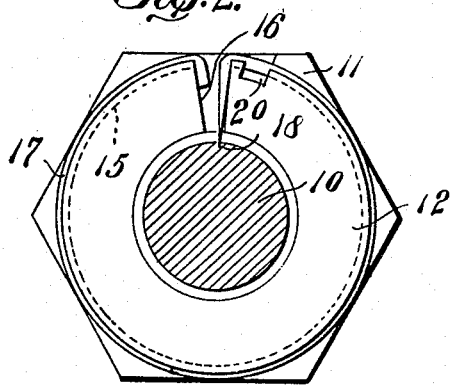
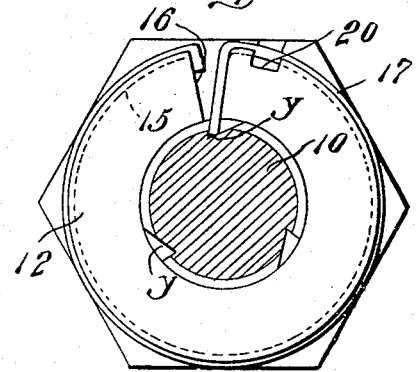
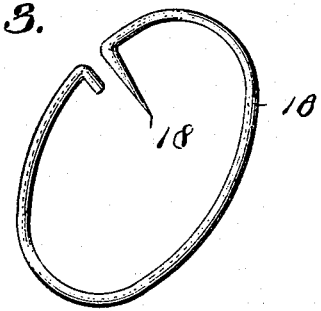
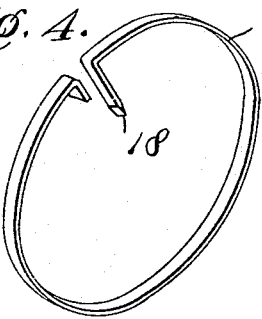
WITNESSES:
Farris S. Fluke
Frederick P. Vaughan INVENTORS
By
ATTORNEYS

UNITED STATES PATENT OFFICE.

FARRIS S. FLUKE AND FREDERICK P. VAUGHAN, OF CHICAGO, ILLINOIS;
SAID VAUGHAN ASSIGNOR TO SAID FLUKE.

NUT-LOCK.

No. 839,281.     Specification of Letters Patent.     Patented Dec. 25, 1906.

Application filed March 7, 1906. Serial No. 304,755.

*To all whom it may concern:*

Be it known that we, FARRIS S. FLUKE and FREDERICK P. VAUGHAN, citizens of the United States, residing at Chicago, in the county of Cook and State of Illinois, have invented a new and useful Nut-Lock, of which the following is a specification.

This invention relates to nut-locks, and has for its principal object to provide a locking device of simple and economical construction which may be readily applied and which will securely hold a nut in any position to which it may be adjusted.

A further object of the invention is to provide a locking device that is carried by the nut and is shielded in such manner as to prevent accidental displacement or loosening from contact with any objects.

A still further object of the invention is to provide an improved nut-lock in which a bolt-engaging pin or similar member is carried by the nut and is provided with a hardened point which may be embedded in the bolt without seriously injuring the bolt.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a perspective view of a nut-lock constructed in accordance with the invention. Fig. 2 is a face view of the same, showing the bolt in section. Fig. 3 is a detail perspective view of the bolt-engaging member detached. Fig. 4 is a similar view illustrating a slight modification of the invention. Fig. 5 is a view similar to Fig. 1, illustrating a further modification of the invention.

Similar numerals of reference are employed to indicate corresponding parts throughout the several figures of the drawings.

The bolt 10 may be of any diameter and of any construction. On the bolt is arranged a nut 11, which is shown in the present instance as hexagonal in form, although it may have hexagonal or other faces for engagement by a wrench or similar tool. The outer face of the nut is provided with a boss 12, that is circular in form and of a diameter a trifle less than the minor diameter of the nut. The periphery of this boss is provided with a groove 15, and the face of the boss has a radially-disposed slot 16 of comparatively narrow width and of a depth approximately equal to the thickness of the boss.

Arranged in the groove 15 is a spring-ring 17, which is preferably formed of round wire, and the ends of the wire are bent over and into the radial slot 16. One end of the wire is shorter than the other and is merely bent over the wall of the slot to form an engaging toe for holding the ring in place, while the opposite end of the wire ring extends inward for engagement with the threads of the bolt. This engaging end or point 18 is sharpened and is hardened or tempered, so that it may bite into the softer metal of the bolt for the purpose of holding the nut from rotative movement, and this may be accomplished without seriously injuring the threads of the bolt, so that if the ring is sprung outward and the point disengaged the nut may be turned off the bolt when required.

To permit displacing the nut from the bolt, a suitable key may be employed. This key is wedge-like in form and fits within an inclined recess 20, that extends across one corner of the nut—that is to say, from one of the flat wrench-engaging edges to the outer face of the boss 12. When the key is forced down into place, it will temporarily raise the bolt-engaging point of the ring, and such point will be held clear of the bolt, so that the nut may be backed off in the usual manner.

In the construction shown in Fig. 4 the ring instead of being formed of round spring-wire is preferably in the form of flat band $17^a$, and the bolt-engaging end or point of this band is flattened down to form a chisel edge or point which will bite into the threads of the bolt and hold the nut from rotative movement.

A further modification is illustrated in Fig. 5, wherein the bolt is shown as provided with longitudinal grooves *y* to receive the bolt-engaging end of the ring. In this case the point need not be sharpened nor is it necessary that it should be hardened, inasmuch as the end when engaged in one of the grooves will securely hold the nut in place.

The device is simple and of economical construction, there being but a single radial slot extending from the opening in the nut to the periphery of the boss, and this slot serving to receive both ends of the ring. The boss being grooved and of slightly less diameter than the minor diameter of the nut affords a sufficient support and shield for the spring-ring, so that the latter cannot be accidentally disengaged by contact with any object.

We claim—

1. In a nut-lock, a nut having a peripherally-grooved boss on one of its faces, and provided with a slot that extends from the bore of the nut to the edge of the boss, a ring disposed in the groove and having its two ends bent inward over the opposite walls of said slot, one of said ends being arranged to engage the bolt.

2. In a nut-lock, a nut having a peripherally-grooved boss on one of its faces and provided with a slot that extends from the bore of the nut to the edge of the boss, a ring disposed in the groove and having its two ends bent inward over the opposite walls of said slot, one of said ends being sharpened to bite into the metal of the bolt.

3. In a nut-lock, a nut having a peripherally-grooved boss on one of its faces and provided with a radial slot that extends from the bore of the nut to the edge of the boss, a spring-ring disposed in the groove and having its two ends bent inward over the opposite walls of the slot, one of such ends being hardened and pointed to bite into the metal of the bolt.

In testimony that we claim the foregoing as our own we have hereto affixed our signatures in the presence of witnesses.

FARRIS S. FLUKE.
FREDERICK P. VAUGHAN.

Witnesses:
  FRED C. BELL,
  M. C. BUSCH,
  JAS. M. WALKER,
  FRANK C. HALL.